United States Patent [19]

Bennett et al.

[11] 4,190,141
[45] Feb. 26, 1980

[54] ELECTROMAGNETIC CLUTCH

[75] Inventors: George T. Bennett, Kettering; Byron L. Brucken, Miamisburg, both of Ohio

[73] Assignee: General Motors Corporation, Detroit, Mich.

[21] Appl. No.: 912,427

[22] Filed: Jun. 5, 1978

[51] Int. Cl.² ............................................. F16D 27/10
[52] U.S. Cl. .................................................. 192/84 C
[58] Field of Search ................. 192/84 A, 84 B, 84 C, 192/84 R; 310/92

[56] References Cited

U.S. PATENT DOCUMENTS

| | | | |
|---|---|---|---|
| 2,914,156 | 11/1959 | Harting | 192/84 B |
| 3,703,227 | 11/1972 | Murakami et al. | 192/84 C |
| 3,719,260 | 3/1973 | Heidorn | 192/84 C |
| 4,122,930 | 10/1978 | Bennett et al. | 192/84 C |

Primary Examiner—Peter P. Nerbun
Attorney, Agent, or Firm—Warren E. Finken

[57] ABSTRACT

The electromagnetic clutch illustrated is adaptable for use with an air-conditioning compressor and includes a rotatable electromagnetic coil and pulley assembly and an armature plate which form part of a 4-pole magnetic flux path. A slip ring is secured to the coil housing, and a spring-loaded brush means is secured to the compressor for sliding engagement with the slip ring. A clutch rotor is secured to an end of the inner coil housing wall adjacent the armature plate and extends radially outwardly from said inner wall so as to provide an uninterrupted circular air space with the outer coil housing wall adjacent the armature plate, such that no shorting of the lines of flux can occur from the end portion of the outer wall to the clutch rotor, providing a faster and stronger attraction of the armature plate when the electromagnetic coil is energized.

2 Claims, 2 Drawing Figures

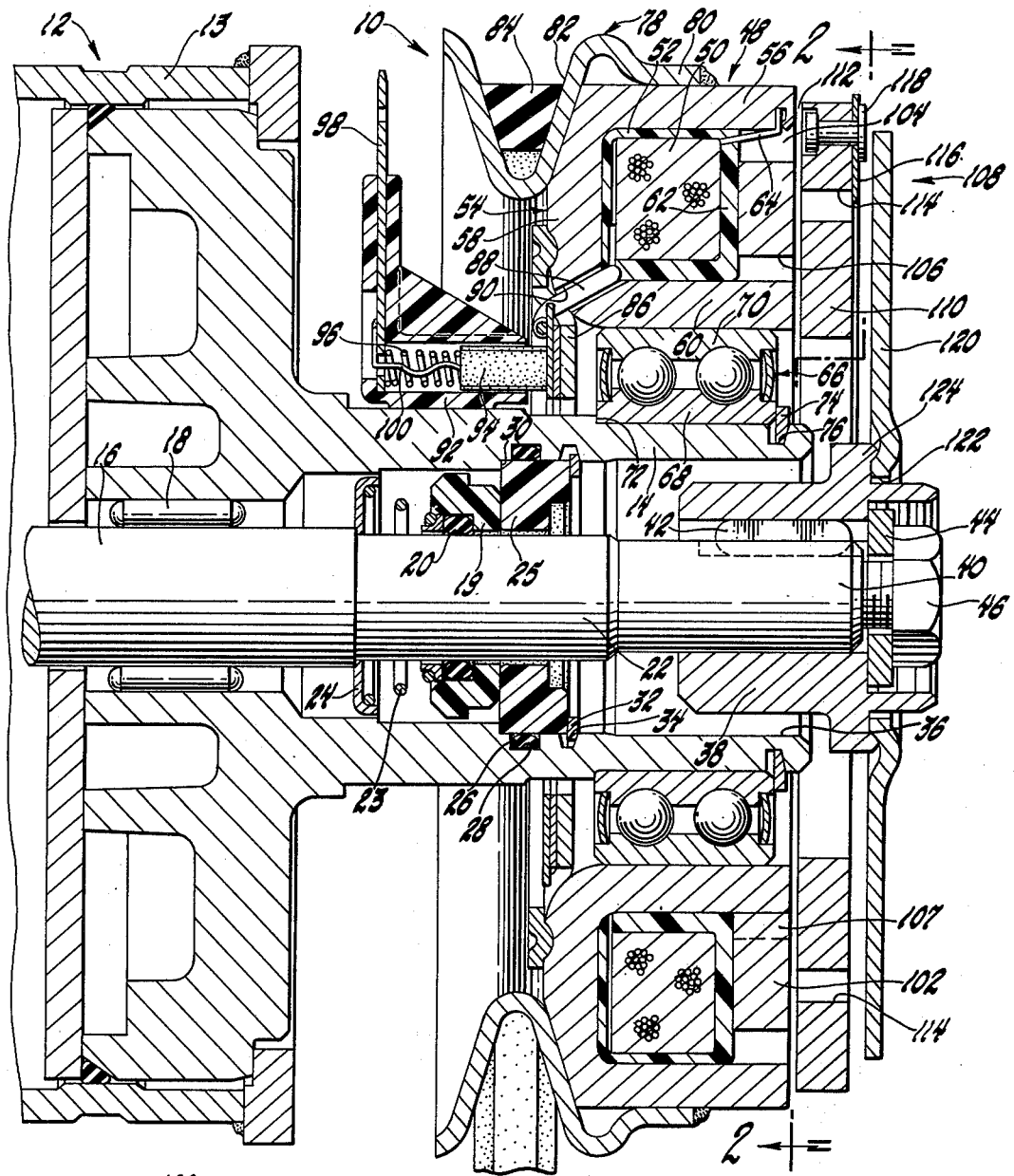
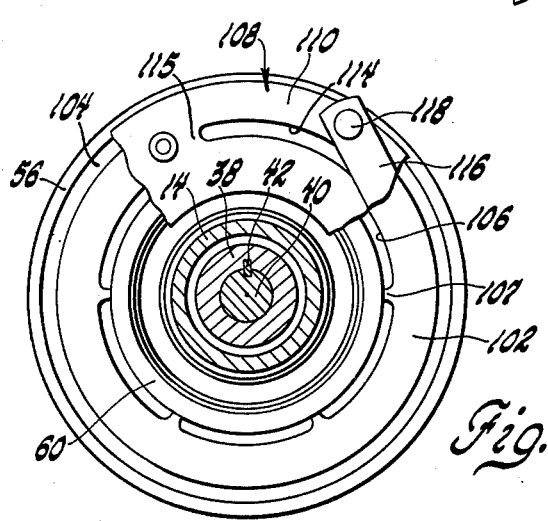
Fig.1
Fig.2

ELECTROMAGNETIC CLUTCH

This invention relates generally to electromagnetic clutches and, more particularly, to electromagnetic clutches for use with vehicular air-conditioning compressors.

An object of the invention is to provide an improved electromagnetic clutch including a flux path wherein shorting across the radially outermost air gap between the outer coil housing wall and the rotor is eliminated.

Another object of the invention is to provide an improved electromagnetic clutch including a coil assembly having inner, outer and front walls, a pulley secured to the outer and front walls, an armature plate, and a clutch rotor or pole member secured to the end of the inner coil housing wall adjacent the armature plate and extending radially outward therefrom so as to provide an uninterrupted circular air space with respect to the adjacent outer coil housing wall, thereby eliminating shorting of the magnetic flux path at the radially outermost pole of a multiple pole arrangement.

These and other objects and advantages of the invention will be apparent when reference is made to the following description and accompanying drawing, wherein:

FIG. 1 is a cross-sectional view illustrating an electromagnetic clutch embodying the invention; and FIG. 2 is a decreased cross-sectional view taken along the plane of the line 2—2 of FIG. 1, and looking in the direction of the arrows.

Referring now to the drawings in greater detail, there is illustrated an electromagnetic clutch 10 suitable for driving an automotive air conditioning compressor 12 including a housing or casing 13, on the forward end of which is formed a fixed tubular extension 14. An input or drive shaft 16 for driving the compressor 12 is rotatably mounted within needle bearings 18, and extends outwardly through the center of the tubular extension 14. A suitable rotating shaft seal 19, including an O-ring type seal ring 20, is mounted around a reduced intermediate portion 22 of the drive shaft 16 to prevent leakage therepast. A coil spring 23 is mounted between a suitable retainer 24 abutted against the shoulder between the shaft portions 16 and 22 and the rotating part 20 of the shaft seal 19, to urge the latter into engagement with a stationary seal ring 25. The latter is sealed within the tubular extension 14 by an O-ring type seal ring 26 mounted in a first groove 28 formed in the inner peripheral surface of the tubular extension 14. The seal ring 25 is confined axially between a shoulder 30 formed within the tubular extension 14 and a split locking ring 32 mounted in a second groove 34 formed in the inner peripheral surface of the tubular extension 14. The inner bore of the tubular extension 14 is enlarged at 36 to facilitate assembly and removal of the locking ring 32, the stationary seal ring 25, and the rotating part of the shaft seal 20.

The enlarged inner bore 36 of the tubular extension 14 provides space for the accommodation of the greater portion of a drive hub 38 which is mounted upon a reduced end portion 40 of the input shaft 16. The drive hub 38 is keyed to the shaft end portion 40 by a suitable key 42 and is retained thereon by a washer 44 and a bolt 46 threadedly mounted in a threaded opening formed in the end of the end portion 40.

A coil assembly 48 includes an annular electromagnetic coil 50, of a predetermined number of turns embedded within a suitable potting compound 52, such as epoxy or nylon, or polyester resin, which is cast within an annular coil housing 54, the latter being formed of a paramagnetic material, such as steel or malleable iron. The coil housing 54 includes a radially outer wall 56, a closed end wall 58 adjacent the casing 13, a radially inner wall 60 spaced a predetermined distance apart from the coil 50, and an originally open end 62 opposite the closed end wall 58. The ground side of the coil 50 is attached via a connector element 64 to the housing wall 56 before the potting compound 52 is added.

A bearing 66 having inner and outer races 68 and 70, respectively, is mounted between the tubular extension 14 and the inner wall 60 of the coil housing 54. The bearing 66 is retained in place on the tubular extension 14 between a shoulder 72 formed on the latter and a split locking ring 74 mounted in a groove 76 formed in the outer surface of the tubular extension adjacent the end thereof.

A pulley assembly 78 includes a cylindrical portion 80 and a pulley groove portion 82 for supporting a drive belt 84. The cylindrical portion and the groove portion may be formed as one piece from sheet metal, if desired, and are secured to the coil housing 54 in any suitable manner, such as by welding the end of the cylindrical portion 80 to the outer coil housing wall, with the pulley groove portion 82 abutted against the end wall 58.

A slip ring 86 is secured to the end wall of the coil housing for rotation therewith. A wire lead 88 is connected between the slip ring and the electromagnetic coil 50 via an opening 90 formed through the end wall. A single brush holder 92 is secured to the tubular extension 14, and a brush 94 is mounted in the brush holder and urged by a coil spring 96 into sliding engagement with the slip ring 86. An electrical connector 98 is mounted in the brush holder 92 and connected to the brush 94 via a wire lead 100 extending axially through the coil spring 96.

An annular radially extending pole member or clutch rotor 102 is secured to the rear end portion of the inner coil housing wall 60 in the open end 62 of the coil housing 54, and spaced at its outer edge a predetermined annular space or gap 104 width away from the inner surface of the outer coil housing wall 56, aligned with the free end faces of the walls 56 and 60. A plurality of circumferentially spaced, concentric arcuate slots 106 are formed in the clutch rotor 102 providing spaced bridging elements 107 at the radially inner peripheral edge thereof, adjacent the inner coil housing wall 60.

An armature plate-driven plate assembly 108 is mounted on the drive hub 38, the assembly 108 including an armature plate 110 shown in a deenergized position adjacent the outer face of the pole member or rotor 102, there being a variable width, radially extending gap or space 112 therebetween. A plurality of conventional circumferentially spaced, concentric arcuate slots 114 are formed in the armature plate 110 providing spaced bridging elements 115 radially intermediate the outer annular gap 112 and the inner plurality of circumferentially spaced arcuate slots 106 formed in the clutch rotor, providing a 4-pole magnetic flux path. The armature plate 110 is retained adjacent the rotor 102 by a plurality of leaf springs 116, each of which is secured by rivets 118 at opposite ends thereof to the armature plate and to a support member or drive plate 120, respectively, The drive plate 120 is secured adjacent a central opening 122 formed therein to the outer end of the drive hub 38, abutted against a flange 124, formed on the latter.

OPERATION

In operation, the clutch 10 is engaged by the energization of the electromagnetic coil 50 via the connector 98, the wire lead 100, the brush 94, the slip ring 86, and the wire lead 88. Such energization of the coil causes the magnetic flux to travel a path through the adjacent paramagnetic material, i.e., from the closed end wall 58 to the adjacent outer wall 56 of the coil housing 54, and, thence, traversing a serpentine path through the 4-pole clutch field resulting from the spaced relationship of the alternately located cooperating annular gap 104 and arcuate slots 114 and 106. More specifically, the flux travels from the end of the outer coil housing wall directly across to the armature plate 110, thence to the pole member 102 and back again to the armature plate 110 on the radially inner side of the arcuate slots 114, and then to the end of the inner coil housing wall and to the end wall 58 to complete the circuit. As a result, the gap 112 between the plane formed by (1) the end face of the outer coil housing wall, (2) the radially aligned pole member 102 and (3) the end face of the inner coil housing wall on the one side and the plane of the face of the armature plate 110 on the other side is closed as the armature plate 110 is pulled to the left in the figure against the force of the leaf spring member 116. Upon engagement of the armature plate, the drive hub 38 and the input shaft 16 are caused to rotate to drive the air-conditioning compressor 12.

It should be noted that, by virtue of no physical connection between the outer coil housing wall and the rotor or pole member 102, there is no shorting across the air gap 104, and, consequently, the lines of flux or force at the outermost pole attracting the armature plate 110 to the end face of the second cylindrical end portion 88 are at their maximum strength, attracting the armature plate quickly. This is particularly significant when one considers that torque=force×distance, where distance is the length of the radius to the pole. Hence, eliminating shorting across the gap 104 at the radially outermost pole improves the performance of the clutch 10 in quickly and efficiently driving the input shaft 16 of the compressor 12.

While but one embodiment of the invention has been shown and described, other modifications thereof are possible.

The embodiments of the invention in which an exclusive property or privilege is claimed are defined as follows:

1. For use with an air-conditioning compressor including a casing having a fixed tubular extension extending from an end surface thereof and a drive shaft extending centrally through said tubular extension, with a drive hub secured to said drive shaft, an electromagnetic clutch comprising a rotatable coil housing having inner and outer walls, an energizable electromagnetic coil mounted in said coil housing, a bearing mounted around said tubular extension adjacent said inner wall for rotatably supporting said coil housing, a slip ring secured to said coil housing, a lead connected between said slip ring and said coil, a brush holder secured to said tubular extension, a spring-loaded brush mounted in said brush holder for sliding engagement with said slip ring, drive means secured to said drive hub, an armature plate positioned adjacent said drive means on the coil side thereof, spring means secured at one end thereof to said armature plate and at the other end thereof to said drive means for movably supporting said armature plate and driveably connecting said armature plate to said drive means, driven means on said coil housing, a clutch rotor secured to the end of said inner wall of said coil housing adjacent said armature plate and extending radially outwardly from said inner wall so as to provide a radially outer uninterrupted annular gap with respect to the adjacent inner surface of said outer wall of said coil housing, first slot means formed with spaced bridging in a radially inner portion of said clutch rotor providing an interrupted inner annular gap adjacent said inner wall, and second slot means formed with spaced bridging in said armature plate providing an interrupted annular gap intermediate said uninterrupted annular gap and said inner annular gap, the arrangement providing a magnetic flux path having the characteristic that no shorting can occur across said uninterrupted outer annular gap so that said armature plate is attracted more quickly with stronger magnetic force when said electromagnetic coil is energized.

2. For use with an air-conditioning compressor including a casing having a fixed tubular extension extending from an end surface thereof and a drive shaft extending centrally through said tubular extension with a drive hub secured to said drive shaft, an electromagnetic clutch comprising a rotatable coil housing having inner and outer walls, a side wall adjacent said casing and an open end facing away from said casing, an electromagnetic coil mounted in said coil housing, a bearing mounted around said tubular extension adjacent said inner wall for rotatably supporting said coil housing, a slip ring secured to said side wall, a lead connected between said slip ring and said coil, a brush holder secured to said tubular extension, a spring-loaded brush mounted in said brush holder for sliding engagement with said slip ring, a drive plate secured to said drive hub, an armature plate positioned adjacent said drive plate on the coil side thereof, a plurality of leaf springs, each secured at one end thereof to said armature plate and at the other end thereof to said drive plate, a pulley secured to said coil housing, a clutch rotor secured to the end of said inner wall of said coil housing adjacent said armature plate and extending radially outwardly from said inner wall so as to provide an uninterrupted annular gap with respect to the adjacent inner surface of said outer wall of said coil housing, a first plurality of concentric circumferentially spaced, arcuate slots formed in a radially inner portion of said clutch rotor providing an inner annular gap, and a second plurality of concentric circumferentially spaced, arcuate slots formed in said armature plate providing a central air gap intermediate said uninterrupted annular gap and said inner annular gap, the arrangement providing a 4-pole magnetic flux path having the characteristic that no shorting can occur across said uninterrupted outer annular gap so that said armature plate is attracted more quickly with stronger magnetic force when said electromagnetic coil is energized.

* * * * *